(12) United States Patent
Choi et al.

(10) Patent No.: US 8,384,259 B2
(45) Date of Patent: Feb. 26, 2013

(54) HORIZONTAL LINEAR VIBRATOR

(75) Inventors: Jun Kun Choi, Gyunggi-do (KR); Hwa Young Oh, Seoul (KR); Yong Jin Kim, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 359 days.

(21) Appl. No.: 12/801,308

(22) Filed: Jun. 2, 2010

(65) Prior Publication Data

US 2011/0068639 A1 Mar. 24, 2011

(30) Foreign Application Priority Data

Sep. 24, 2009 (KR) .................. 10-2009-0090627

(51) Int. Cl.
*H02K 33/00* (2006.01)

(52) U.S. Cl. ................ 310/81; 310/15; 310/25

(58) Field of Classification Search .............. 310/81, 310/20, 25, 29, 15, 17
See application file for complete search history.

(56) References Cited

U.S. PATENT DOCUMENTS

| | | | | |
|---|---|---|---|---|
| 5,682,132 A | * | 10/1997 | Hiroyoshi et al. | 340/407.1 |
| 5,921,134 A | * | 7/1999 | Shiba et al. | 74/110 |
| 6,700,251 B2 | * | 3/2004 | Kobayashi et al. | 310/81 |
| 7,358,633 B2 | * | 4/2008 | Kweon et al. | 310/81 |
| 8,110,951 B2 | * | 2/2012 | Huang | 310/25 |
| 2005/0285454 A1 | | 12/2005 | Choi et al. | |
| 2006/0066164 A1 | | 3/2006 | Kim | |
| 2008/0150380 A1 | | 6/2008 | Hsiao et al. | |

FOREIGN PATENT DOCUMENTS

| | | |
|---|---|---|
| CN | 1745907 A | 3/2006 |
| CN | 1751809 A | 3/2006 |
| JP | 2002-200460 | 7/2002 |
| JP | 2004-57958 | 2/2004 |
| KR | 10-0593918 | 6/2006 |

OTHER PUBLICATIONS

Chinese Office Action for Application No. 201010197282.0 issued Aug. 8, 2012.

* cited by examiner

*Primary Examiner* — Dang Le (57) ABSTRACT

A horizontal linear vibrator includes: a cover unit; a bracket providing an internal space between the cover unit and the bracket; a vibration unit including a mass body having an insertion part providing an accommodating space at one surface thereof, mounted in the internal space, and making a horizontal, linear movement; a magnetic field unit providing an electromagnetic force to allow the vibration unit to move horizontally; and one or more sub-mass units inserted in the insertion part in order to adjust a resonance frequency of the vibration unit.

10 Claims, 6 Drawing Sheets

HORIZONTAL LINEAR VIBRATOR

CROSS-REFERENCE TO RELATED APPLICATIONS

This application claims the priority of Korean Patent Application No. 10-2009-0090627 filed on Sep. 24, 2009, in the Korean Intellectual Property Office, the disclosure of which is incorporated herein by reference.

BACKGROUND OF THE INVENTION

1. Field of the Invention

The present invention relates to a horizontal linear vibrator and, more particularly, to a horizontal linear vibrator designed to be mounted on a personal mobile terminal to vibrate.

2. Description of the Related Art

In general, one of the key functions requisite for communication devices is a call reception function. Commonly used call reception functions include a sound generating function that generates a melody or a bell sound and a vibration function that transfers vibrations to a device.

Among the functions, the vibration function is commonly used so as not to interfere with others by preventing a melody or a bell sound from being transferred to the exterior through a speaker.

In order to implement such a vibration function, in general, a small vibration motor is driven to transfer a driving force to a case of a device to make the device vibrate.

In particular, recently, as mobile terminals have been reduced in size and have improved in quality, the use of a touch screen type display device has been greatly favored, requiring a vibration generation function when a touch is applied to the touch screen, so the improvement of the vibration motor has gradually taken place.

A vibration motor applied to mobile phones generates rotatory power in order to rotate a rotational part of an unbalance mass, thus obtaining mechanical vibrations, and in this case, rotatory power is generated such that it is mostly subjected to a rectifying action through a brush and a contact point of a commutator (or rectifier) to provide current to a rotor coil.

However, in the brush type structure using a commutator, when the motor rotates, the brush passes through the gap between segments of the commutator, generating a mechanical friction and an electrical spark, abrading the brush and the commutator and thereby shortening the life span of the motor.

In addition, because voltage is applied to the motor by using a moment of inertia, time is taken to reach a target amount of vibrations, so it is difficult to implement vibrations suitable for touch screen-employed personal mobile terminals and the like.

Meanwhile, a linear horizontal vibrator vibrates by using a resonance frequency and electromagnetic force. Because the linear horizontal vibrator does not cause mechanical friction or abrasion, it has a long life span and fast response time, thus being favored for a haptic feedback structure.

In this case, the resonance frequency is a key factor for determining vibration power; however, the resonance frequency varies depending on the fabrication deviation of components, which makes the vibration power vary to fail to obtain desired vibration power. Thus, techniques for resolving such problems are required.

SUMMARY OF THE INVENTION

An aspect of the present invention provides a horizontal linear vibrator vibrating in a horizontal direction, namely, in a lengthwise direction, of a personal mobile terminal, whose resonance can be controlled arbitrarily.

According to an aspect of the present invention, there is provided a horizontal linear vibrator including: a cover unit; a bracket providing an internal space between the cover unit and the bracket; a vibration unit including a mass body having an insertion part providing an accommodating space at one surface thereof, mounted in the internal space, and making a horizontal, linear movement; a magnetic field unit providing an electromagnetic force to allow the vibration unit to move horizontally; and one or more sub-mass units inserted in the insertion part in order to adjust a resonance frequency of the vibration unit.

The vibration unit may include a yoke part having an internal space for accommodating the magnetic field therein, and the insertion part may be formed at both sides of the internal space.

The vibration unit may include a yoke part having an internal space for accommodating the magnetic field therein, and the insertion part may be formed to be separated from the internal space.

The insertion part may be a hole formed through the mass body.

The insertion part may be a recess having a shape corresponding to the sub-mass unit.

The sub-mass unit may be made of tungsten.

The vibration unit may include a yoke part having an internal space for accommodating the magnetic field therein, and the yoke part may include an extending portion bent to be tightly attached to an outer surface of the mass body.

The bracket may include a bobbin formed in the internal space, and the magnetic field unit may include a coil part insertedly formed in the bobbin and a magnet disposed to be adjacent to the coil part.

The coil part may have a quadrangular shape.

A circuit board may be installed at an upper portion of the bracket and connected with an external input terminal.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions may be exaggerated for clarity, and the same reference numerals will be used throughout to designate the same or like components.

A horizontal linear vibrator according to exemplary embodiments of the present invention will now be described in detail with reference to FIGS. 1 to 9.

Figure 1:
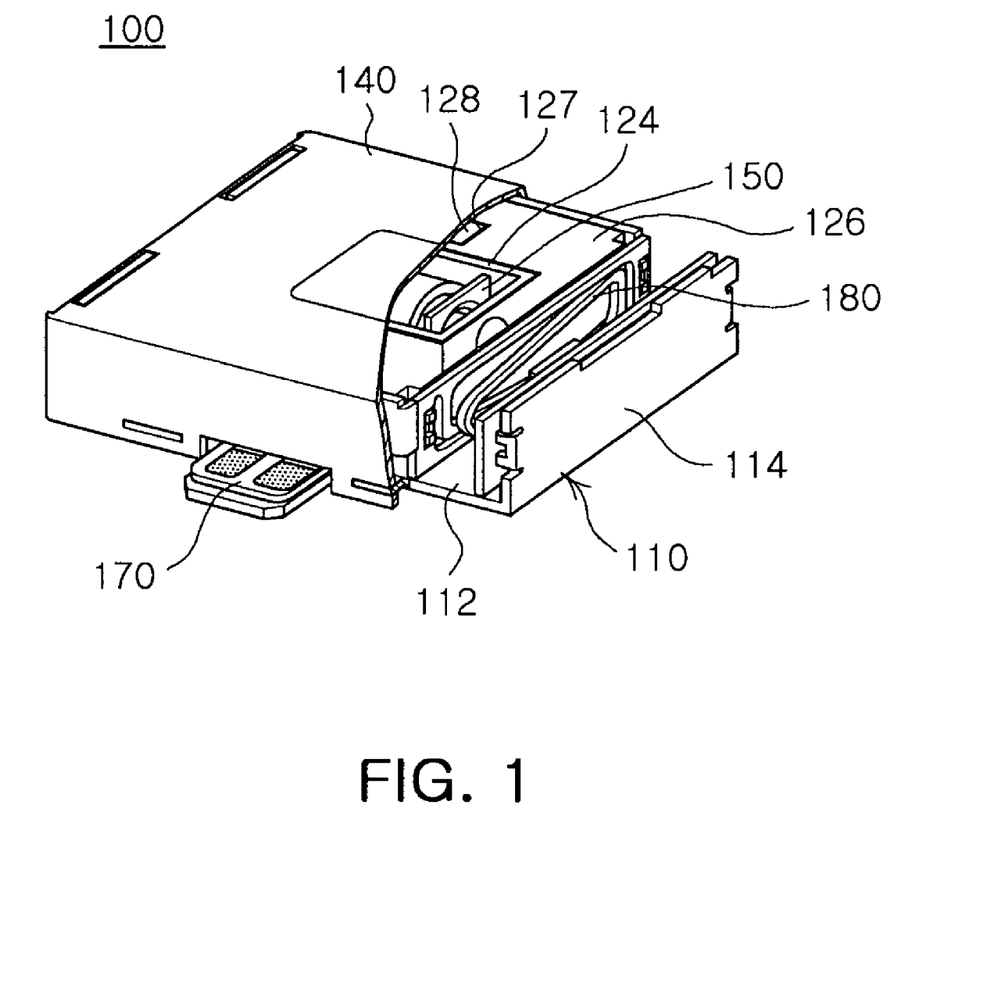
FIG. 1 is a perspective view for explaining a horizontal linear vibrator according to an exemplary embodiment of the present invention.
Figure 2:
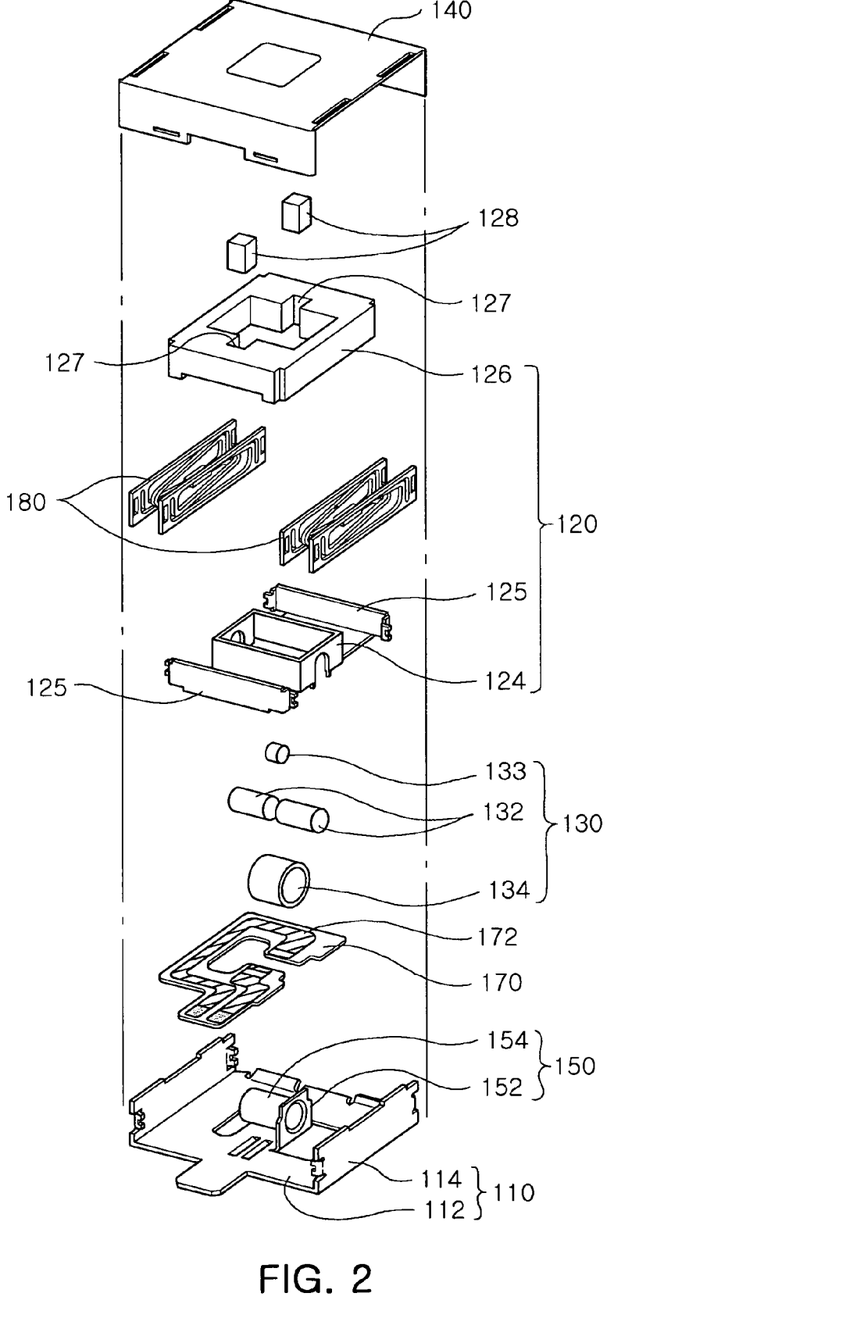
FIG. 2 is an exploded perspective view of the horizontal linear vibrator of FIG. 1.

FIG. 1 is a perspective view for explaining a horizontal linear vibrator according to an exemplary embodiment of the present invention, and FIG. 2 is an exploded perspective view of the horizontal linear vibrator of FIG. 1.

With reference to FIGS. 1 and 2, a horizontal linear vibrator 100 may include a bracket 110, a vibration unit 120, a magnetic field unit 130, and a cover unit 140.

The bracket 110 has a structure in which an upper portion and a lengthwise directional side portion of the bracket 110 are open to correspond to the cover unit 140. Namely, the bracket 110 is formed to have a bracket lower plate 112 and widthwise directional side portions 114 and assembled with the cover unit 140 to form an internal space.

A bobbin 150 may be formed on an upper portion of the bracket lower plate 112 in order to insertedly fix a cylindrical coil 134, and a circuit board 170 may be mounted to be positioned near the bobbin 150.

The side portions 114 are formed to be bent to be perpendicular to the bracket lower plate 112 to allow spring members 180 to be insertedly fixed to an inner circumferential surface of the side portions 114. Thus, an outer shape of the bracket 110 may be a channel-like shape, but the outer shape of the bracket 110 is not limited thereto.

The bobbin 150 is positioned at the center of the upper portion of the bracket lower plate 112 and may include a vertical plate part 152 bent to be vertical to the bracket lower plate 112 and a cylindrical part 154 extending from the vertical plate part 152 such that it is horizontal to the bracket lower plate 112.

The vertical plate part 152 and the cylindrical part 154 may have a hollow portion through which a magnet 132 moves reciprocally.

Here, a cylindrical coil 134 is insertedly fixed on an outer circumferential surface of the bobbin 150, and the bobbin 150 has the cylindrical shape with a hollow portion therein allowing the magnet 132 to make a reciprocal movement therethrough. However, the structure of the bobbin 150 is not limited thereto, and the structure may be omitted.

The circuit board 170 is connected with an external input terminal and transfers power applied thereto to the cylindrical coil 134. The circuit board 170 may include a pattern part 172 formed on its upper surface and an opening part formed therein to allow the bobbin 150 to pass therethrough.

However, the circuit board 170 is not limited to the configuration in which it is formed separately from the bracket 110. Namely, the circuit board 170 and the bracket 110 may be integrally formed according to a designer's intention.

The coil part may include the cylindrical coil 134. The cylindrical coil 134 serves to generate an electric field of a certain strength when power is applied thereto from an external source. The cylindrical coil 134 may be inserted onto the outer circumferential surface of the cylindrical part 154 of the bobbin 150.

A coil line of the cylindrical coil 134 is connected with the pattern part 172 of the circuit board 170 through soldering, whereby power can be applied to the cylindrical coil 134 from an external source. However, the coil part is not limited to the cylindrical shape, and a rectangular coil may be applicable.

The vibration unit 120 includes a yoke part 124 accommodating both the cylindrical coil 134 and the magnet 132 therein, and a mass body 126 accommodating the magnet 132 and the yoke part 124. The vibration unit 120 moves in a horizontal vibration direction by an interaction of the magnet 132 and the cylindrical coil 134.

The magnetic field unit 130 includes the cylindrical coil 132 accommodated in the bobbin 150 and the magnet 132 disposed to be adjacent to the cylindrical coil 134.

A vibration direction of the vibration unit 120 is determined according to the Lorentz Force by an electric force of the frequency generated from the cylindrical coil 134 and the direction of a magnetic field generated toward the yoke part 124 from the magnet 132.

The magnet 132 serves to force the vibration unit to move linearly according to its interaction with the cylindrical coil 134 by generating a magnetic field of a certain strength. The magnets 132 are attached to both sides of a magnetic core 133.

Here, the magnets 132 attached to both sides of the magnetic core 133 may be disposed such that the same polarities face each other.

In this case, a magnetic fluid may be coated on an outer circumferential surface of the magnet 132 in order to prevent the magnet 132 from being directly brought into contact with an inner circumferential surface of the cylindrical part 154 of the bobbin 150 when the mass body 126 vibrates horizontally.

Here, the magnetic fluid is obtained by stably dispersing magnetic powder in a colloid shape in a liquid and then adding a surfactant thereto to prevent the magnetic powder from being precipitated or coagulated due to gravitation or a magnetic field. For example, the magnetic fluid may include a magnetic fluid obtained by dispersing triiron tetroxide or iron-cobalt alloy molecules in oil or water and, recently, a magnetic fluid obtained by dispersing cobalt in toluene.

The magnetic powder is ultrafine particles having a size of 0.01 μm to 0.02 μm, has Brownian motion peculiar to ultrafine particles, and has the characteristics that the concentration of the magnetic powder particles in the fluid is uniformly maintained even when an external magnetic field, gravitation, centrifugal force, etc., is applied thereto.

The yoke part 124 serves to self-close a circuit to smoothly form a magnetic flux of the magnet 132. The yoke part 124 may have an internal space in which the cylindrical coil 134 and the magnet 132 are accommodated.

Both sides of the yoke part 124 may include extending parts 125 bent so as to be positioned perpendicular to the bracket lower plate 112 and tightly attached to the outer side of the mass body. Thus, when a central portion of the yoke part 124 is accommodated in the accommodation space of the mass body 126, the extending parts 125 can be tightly attached to the outer side of the mass body 126, and thus, the mass body 126 and the extending parts 126 can be stably bound.

The spring members 180 serve to elastically support the vibration unit 120 to move in a horizontally in a linear direction. In a state that one side of the spring members 180 are fixed to the widthwise directional side portions 114, the other side of the spring member 180 is fixed to the vibration unit 120, thus elastically supporting the vibration unit 120.

Here, the spring members 180 are provided as pairs in corresponding positions at both sides of the vibration unit 120, and disposed at an upper portion of the bracket 110. The spring member 180 may be, for example, a coil spring, a leaf spring, or the like.

The cover unit 140 is formed to cover the upper portion of the bracket 110 and protects the internal constituents against an external impact.

The mass body 126 serves to apply a certain mass to the vibration unit 120 for linear vibrations, and includes an accommodation space to accommodate the central portion of the yoke part 124 therein. Thus, the mass body 126 accommodates the central portion of the yoke part 124 accommodating the magnet 132 in its accommodating space, and assembled such that the extending parts 125 bent from the yoke part 124 are in contact with the outer sides of the mass body 126.

The mass body 126 may have a mass of a certain size and vibrates horizontally in a vibration direction according to an interaction of the magnet 132 and the cylindrical coil 134. Here, the vibration direction refers to a direction horizontal to the cylindrical coil 134.

The mass body 126 includes insertion portions 127 formed to be adjacent to the space accommodating the yoke part 124. The insertion portions 127 may be formed when the internal accommodating space of the mass body 126 is formed. The insertion portions 127 are provided at both sides of the internal accommodating space. The shape of the insertion portions 127 correspond to that of sub-mass parts 128.

After the mass body 126 is bound with the yoke part 124, the sub-mass parts 128 may be additionally inserted into the insertion portions 127.

Here, the sub-mass parts 128 are formed to have a certain unit mass, and one or more sub-mass parts 128 may be inserted into the insertion portions 127 as necessary.

The sub-mass part 128 may be made of tungsten having a high specific gravity or a general material having a certain weight. However, without being limited thereto, the sub-mass part 128 may be made of various other materials according to the designer's intention.

In this manner, the horizontal linear vibrator according to the present exemplary embodiment is mounted in a personal mobile terminal such that it vibrates horizontally in a lengthwise direction, of the personal mobile terminal, rather than in a thicknesswise direction, so the thickness of the personal mobile terminal can be reduced. Also, because the movement displacement of the vibration unit 120 is formed to be lengthy along the lengthwise direction of the personal mobile terminal to secure the movement displacement, vibration performance can be further improved.

FIGS. 3 to 6 are perspective views for explaining the process of assembling the horizontal linear vibrator and an effect of the horizontal linear vibrator according to an exemplary embodiment of the present invention.

Figure 3:
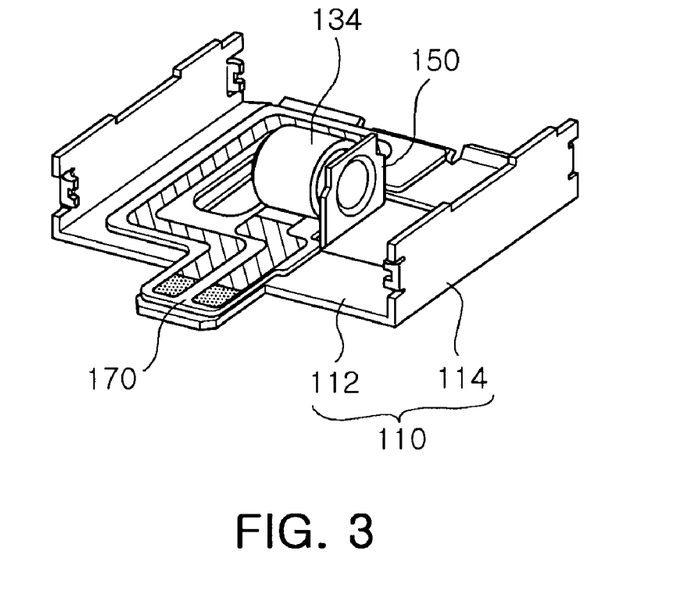
FIGS. 3 to 6 are perspective views for explaining the process of assembling the horizontal linear vibrator and an effect of the horizontal linear vibrator according to an exemplary embodiment of the present invention.
Figure 4:
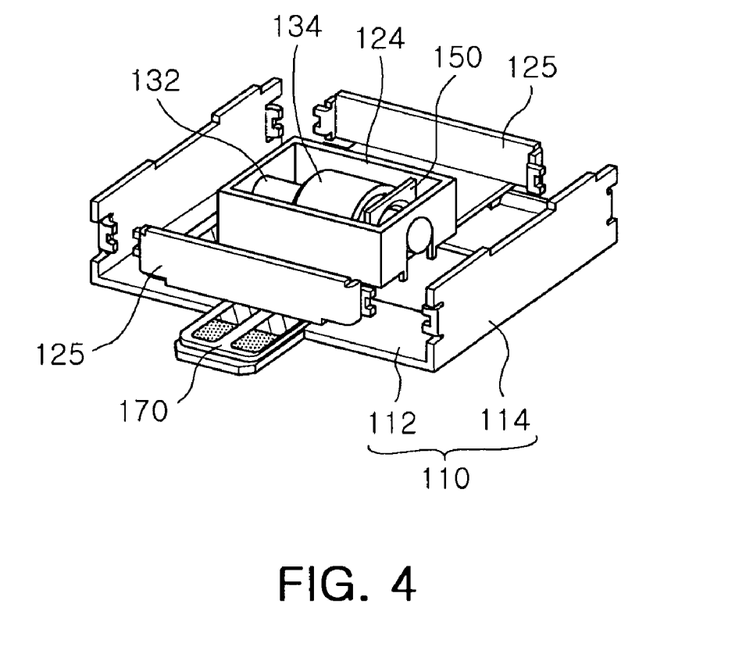

As shown in FIGS. 3 and 4, the circuit board 170 is attached to the upper portion of the bracket 110. Here, the circuit board 170 is connected with an external input terminal to transfer power applied thereto to the cylindrical coil 134.

The cylindrical coil 134 may be disposed to surround the bobbin 150, and, according to this configuration, an empty space may be provided at the center of the bobbin 150 and the cylindrical coil 134, and the magnet 132 may be mounted in the empty space.

As shown in FIG. 4, the yoke part 124 is disposed to accommodate the cylindrical coil 134 on an inner surface of the bracket 110.

In this case, the extending parts 125 bent to be positioned to be perpendicular to the bracket lower plate 112 at both sides of the yoke part 124 are disposed between the side portions 114 of the bracket 110.

Figure 5:
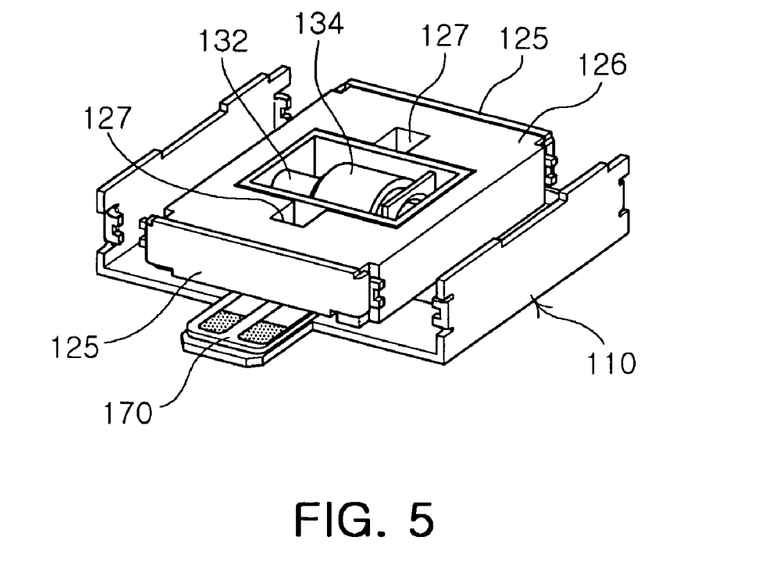

As shown in FIG. 5, the mass body 126 is mounted on the bracket 110, and the yoke part 124 accommodating the magnet 132 and the cylindrical coil 134 is inserted into the hollow formed at the center of the mass body 126.

The spring member 180 may be disposed on both sides of the mass body 126, and in a follow-up process, the cover unit 140 may be assembled to complete the horizontal linear vibrator.

Figure 6:
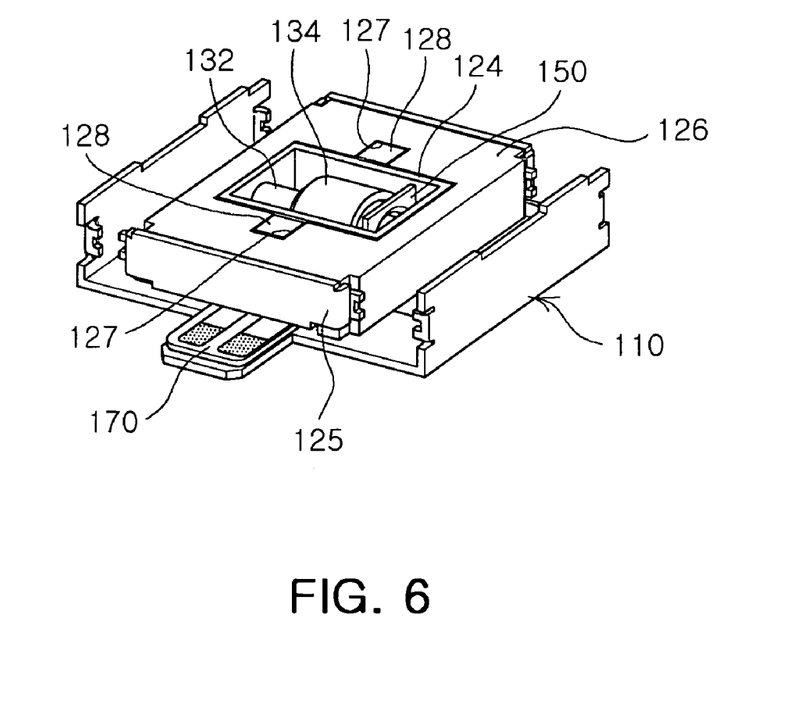

With reference to FIG. 6, the insertion portions 127 may be formed to be adjacent to the hollow of the mass body 126 to allow the sub-mass parts 128 to be additionally inserted therein.

Here, a resonance frequency (F) is affected by the mass (m) of a vibration body and a spring constant (k) as noted in Equation 1 shown below:

$$F = \frac{1}{2\pi}\sqrt{\frac{k}{m}} \qquad \text{[Equation 1]}$$

In Equation 1, the weight of the mass body 126 is m, and the spring constant of the spring member 180 is k.

Accordingly, in order to minimize the distribution of the resonance frequency and perform correction to have a requested resonance frequency, a method of controlling the spring constant (K) as a key factor of the resonance frequency may be used, but this method has a difficulty in precisely adjusting the spring constant of the spring member 180 in actuality. It is easier to adjust the weight of the mass body 126 rather than the spring constant of the spring member 180.

Thus, in the present exemplary embodiment, the sub-mass part 128 as much as a certain mass which has been previously calculated according to a requested resonance frequency is inserted into the insertion portion 127, thus adjusting the weight (m) of the mass body 126.

Figure 7:
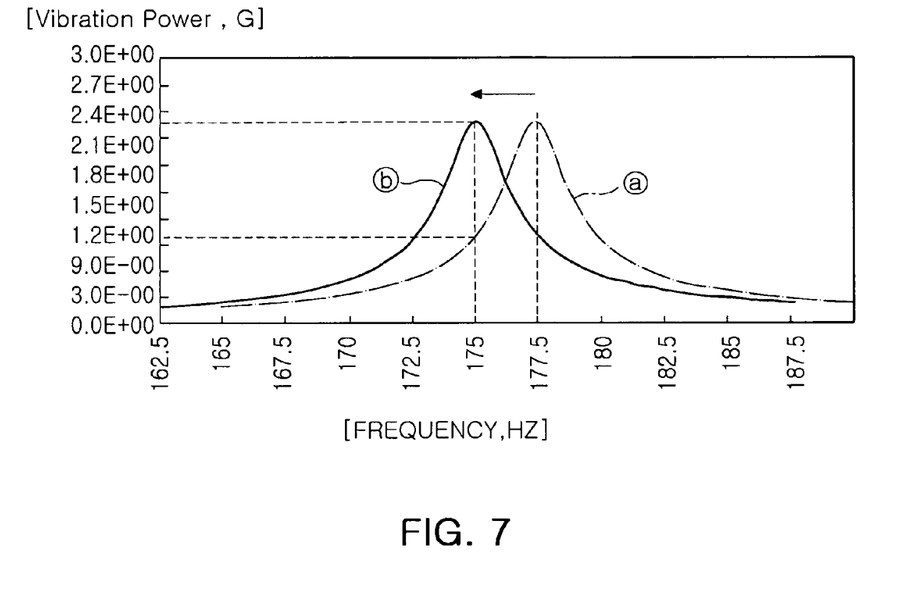
FIG. 7 is a graph for explaining the effect of the horizontal linear vibrator according to an exemplary embodiment of the present invention.

FIG. 7 is a graph for explaining the effect of the horizontal linear vibrator according to an exemplary embodiment of the present invention.

With reference to FIG. 7, line (a) indicates the amount of vibrations of the horizontal linear vibrator measured before the sub-mass part 128 is inserted, and line (b) indicates the amount of vibrations of the horizontal linear vibrator measured after the sub-mass part 128 is inserted.

Here, when the sub-mass part 128 is inserted, the resonance frequency drops from the line (a) to the line (b) based on the foregoing formula.

For example, when a vibration body having a resonance frequency of 177.5 Hz operates at an input frequency of 175 Hz, the vibration power is about 1.2 Grms. Comparatively, when a sub-mass part-added vibration body operates at the input frequency of 175 Hz, maximum vibration power is measured as a value of 2.3 Grms. As a result, it is noted that when the sub-mass part 128 is added to the vibration motor, which then operates at the input frequency of 175 Hz, a two-fold increase in vibration power or more is obtained.

A general vibration motor has a problem in that resonance frequencies have deviations due to a distribution of component dimensions, a distribution of component assembling, and the like.

However, in the present exemplary embodiment, because the sub-mass part 128 is inserted into the insertion portion 127 of the mass body 126, the deviation of the resonance frequency can be minimized, and because a desired resonance frequency band is stably secured, the amount of vibrations can be maximized.

Figure 8:
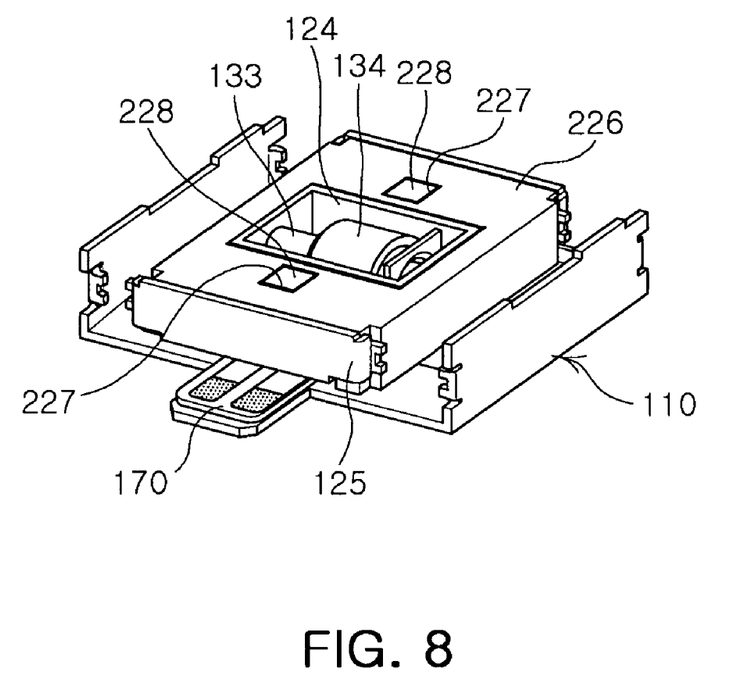
FIG. 8 is a perspective view for explaining a horizontal linear vibrator according to another exemplary embodiment of the present invention.

FIG. 8 is a perspective view for explaining a horizontal linear vibrator according to another exemplary embodiment of the present invention.

With reference to FIG. 8, a mass body 226 is disposed on the bracket 110 such that a central portion of the yoke part 125 is accommodated therein.

In this case, the mass body 226 includes insertion portions 227 formed to be separated from the space accommodating the yoke part 124.

A plurality of insertion portions 227 may be formed to be parallel and may be symmetrically formed based on the accommodation space. However, the present invention is not limited thereto, and the insertion portions 227 may be formed to be asymmetrical.

After the mass body 226 is bound with the yoke part 124, the sub-mass part 128 may additionally be inserted into the insertion portion 227 to adjust the weight (m) of the mass body 226.

Figure 9:
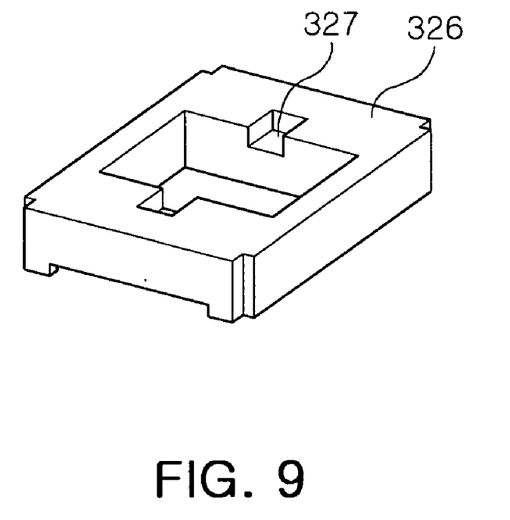
FIG. 9 is a schematic perspective view for explaining a mass body of the horizontal linear vibrator according to another exemplary embodiment of the present invention.

FIG. 9 is a schematic perspective view for explaining a mass body of the horizontal linear vibrator according to another exemplary embodiment of the present invention.

With reference to FIG. 9, insertion portions 327 may be formed as recesses, rather than as holes, on a mass body 326. In the present exemplary embodiment, the insertion portions 327 are formed at both sides of an internal space formed at the center, but the present invention is not limited thereto and the insertion portions 327 may be formed to be separated from the internal space.

After the mass body 326 is bound with the yoke part 124, the sub-mass part 128 may be additionally inserted into the insertion portion 327 to adjust the weight (m) of the mass body 226.

As a result, in the present exemplary embodiments, because the sub-mass parts 128 and 228 are inserted into the insertion portions 227 and 327 of the mass bodies 226 and 326, the deviation of the resonance frequency can be minimized, and also, because a desired resonance frequency band is stably secured, the amount of vibrations can be maximized.

As set forth above, according to exemplary embodiments of the invention, because the horizontal linear vibrator is mounted in a personal mobile terminal such that it vibrates in a horizontal direction, namely, in a lengthwise direction, rather than in a thicknesswise direction, of the personal mobile terminal, the personal mobile terminal can become slimmer. Also, because the movement displacement of the vibration unit is lengthy along the lengthwise direction of the personal mobile terminal to secure the movement displacement of the vibration unit, the vibration performance can be improved.

In addition, because the horizontal linear vibrator includes a sub-mass unit, a defect rate of the process can be reduced and quality can be stabilized. Also, the amount of vibration can be maximized by stably securing a resonance frequency band.

While the present invention has been shown and described in connection with the exemplary embodiments, it will be apparent to those skilled in the art that modifications and variations can be made without departing from the spirit and scope of the invention as defined by the appended claims.

What is claimed is:

1. A horizontal linear vibrator comprising:
   a cover unit;
   a bracket providing an internal space between the cover unit and the bracket;
   a vibration unit including a mass body and a yoke part, mounted in the internal space, and making a horizontal, linear movement, the mass body having an insertion part providing an accommodating space in one surface thereof;
   a magnetic field unit providing an electromagnetic force to allow the vibration unit to move horizontally; and
   one or more sub-mass units inserted in the insertion part in order to adjust a resonance frequency of the vibration unit.

2. The vibrator of claim 1, wherein the yoke part has an internal space for accommodating the magnetic field therein, and the insertion part is formed at both sides of the internal space.

3. The vibrator of claim 1, wherein the yoke part has an internal space for accommodating the magnetic field therein, and the insertion part is formed to be separated from the internal space.

4. The vibrator of claim 1, wherein the insertion part is a hole formed through the mass body.

5. The vibrator of claim 1, wherein the insertion part is a recess having a shape corresponding to the sub-mass unit.

6. The vibrator of claim 1, wherein the sub-mass unit is made of tungsten.

7. The vibrator of claim 1, wherein the yoke part has an internal space for accommodating the magnetic field therein, and the yoke part comprises an extending portion bent to be tightly attached to an outer surface of the mass body.

8. The vibrator of claim 1, wherein the bracket comprises a bobbin formed in the internal space, and the magnetic field unit comprises a coil part insertedly formed in the bobbin and a magnet disposed to be adjacent to the coil part.

9. The vibrator of claim 8, wherein the coil part has a quadrangular shape.

10. The vibrator of claim 1, wherein a circuit board is installed at an upper portion of the bracket and connected with an external input terminal.

* * * * *